Oct. 26, 1954  J. HALAHAN ET AL  2,692,529
FILM PROJECTION APPARATUS
Filed June 3, 1949  6 Sheets-Sheet 1
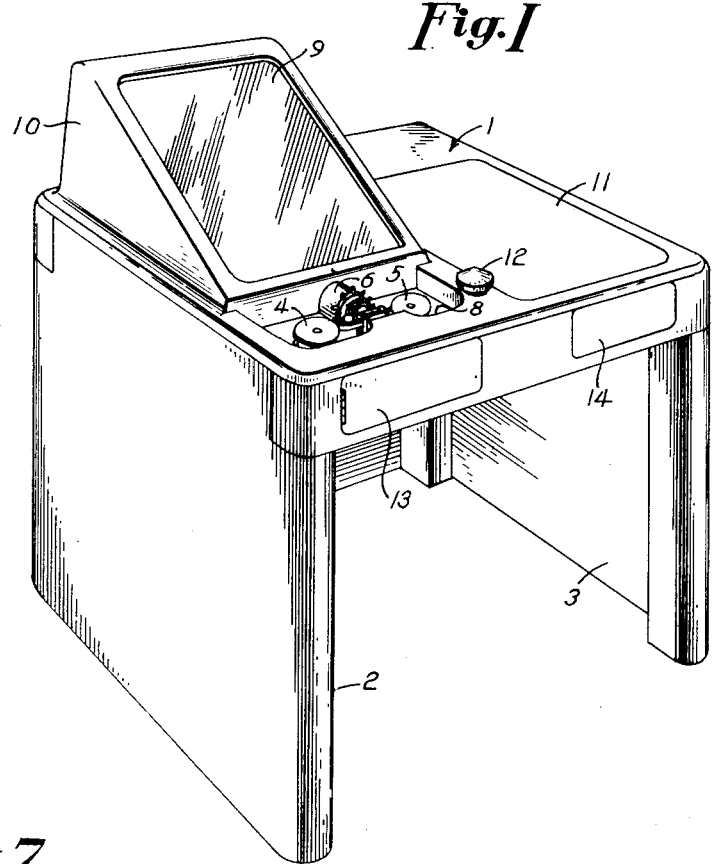
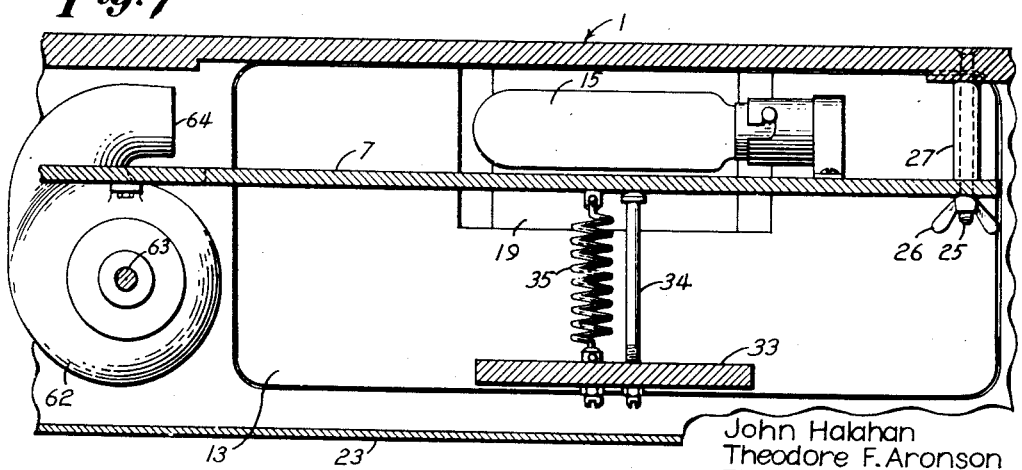
John Halahan
Theodore F. Aronson
Floyd A. Lyon
INVENTORS
BY
ATTORNEY

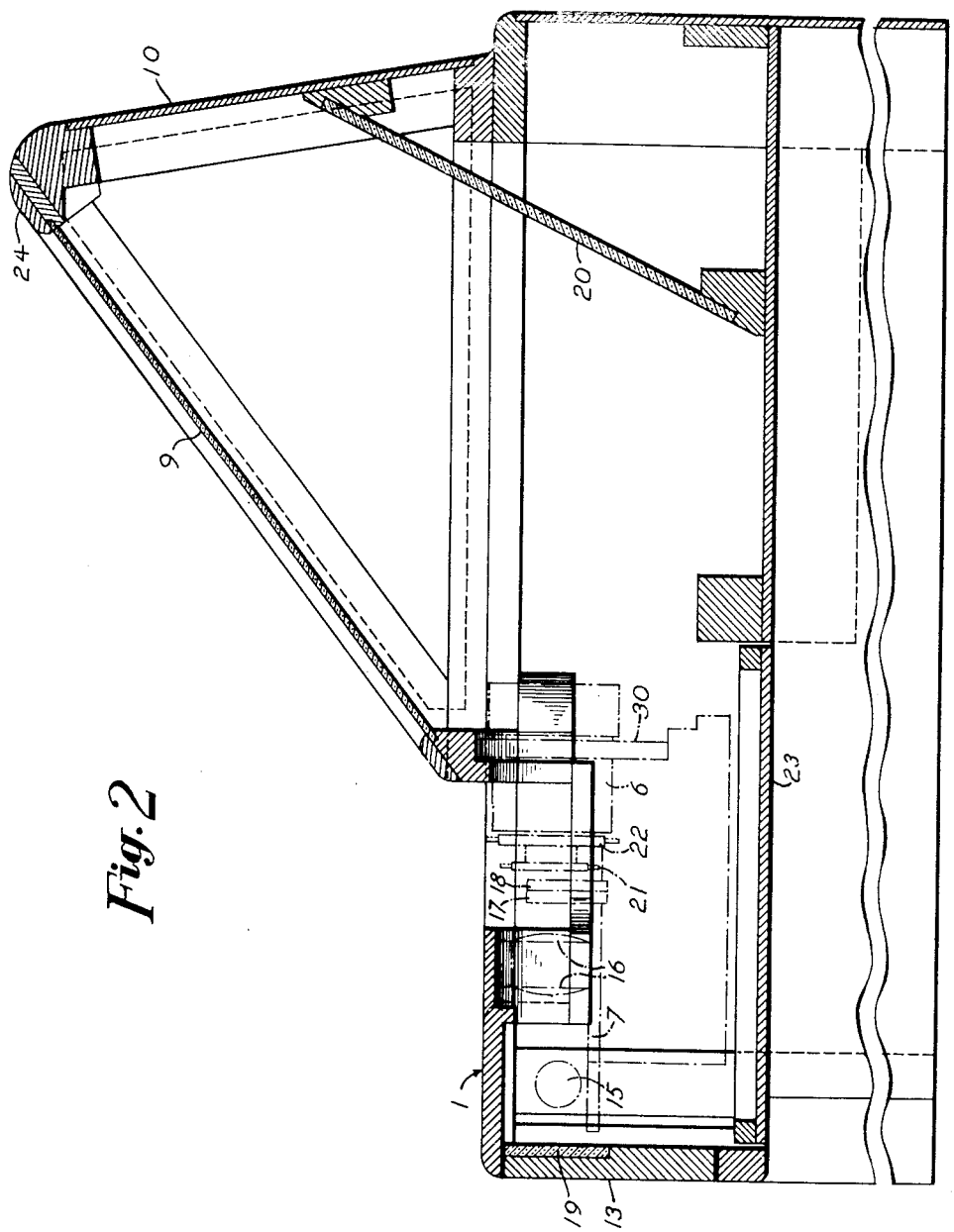

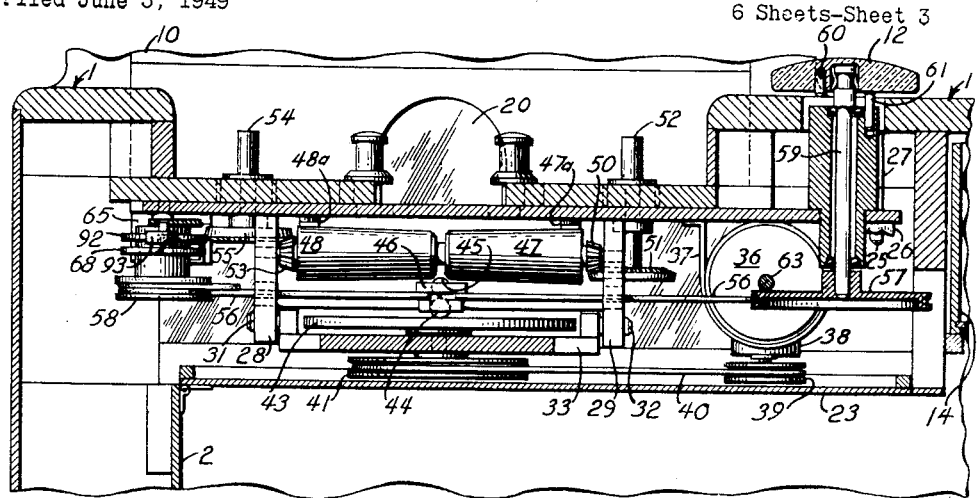

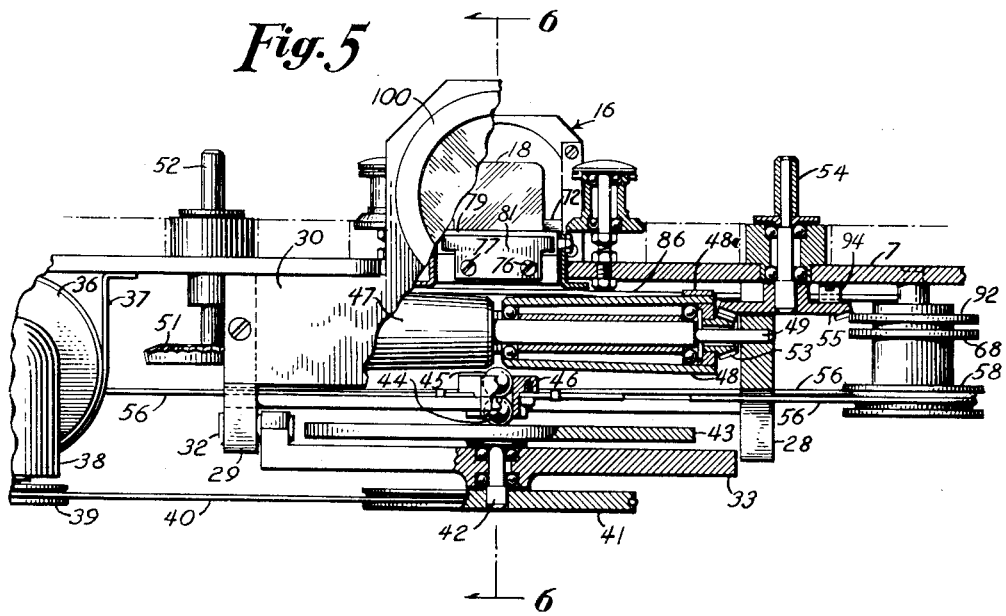

Oct. 26, 1954  J. HALAHAN ET AL  2,692,529
FILM PROJECTION APPARATUS
Filed June 3, 1949  6 Sheets-Sheet 5
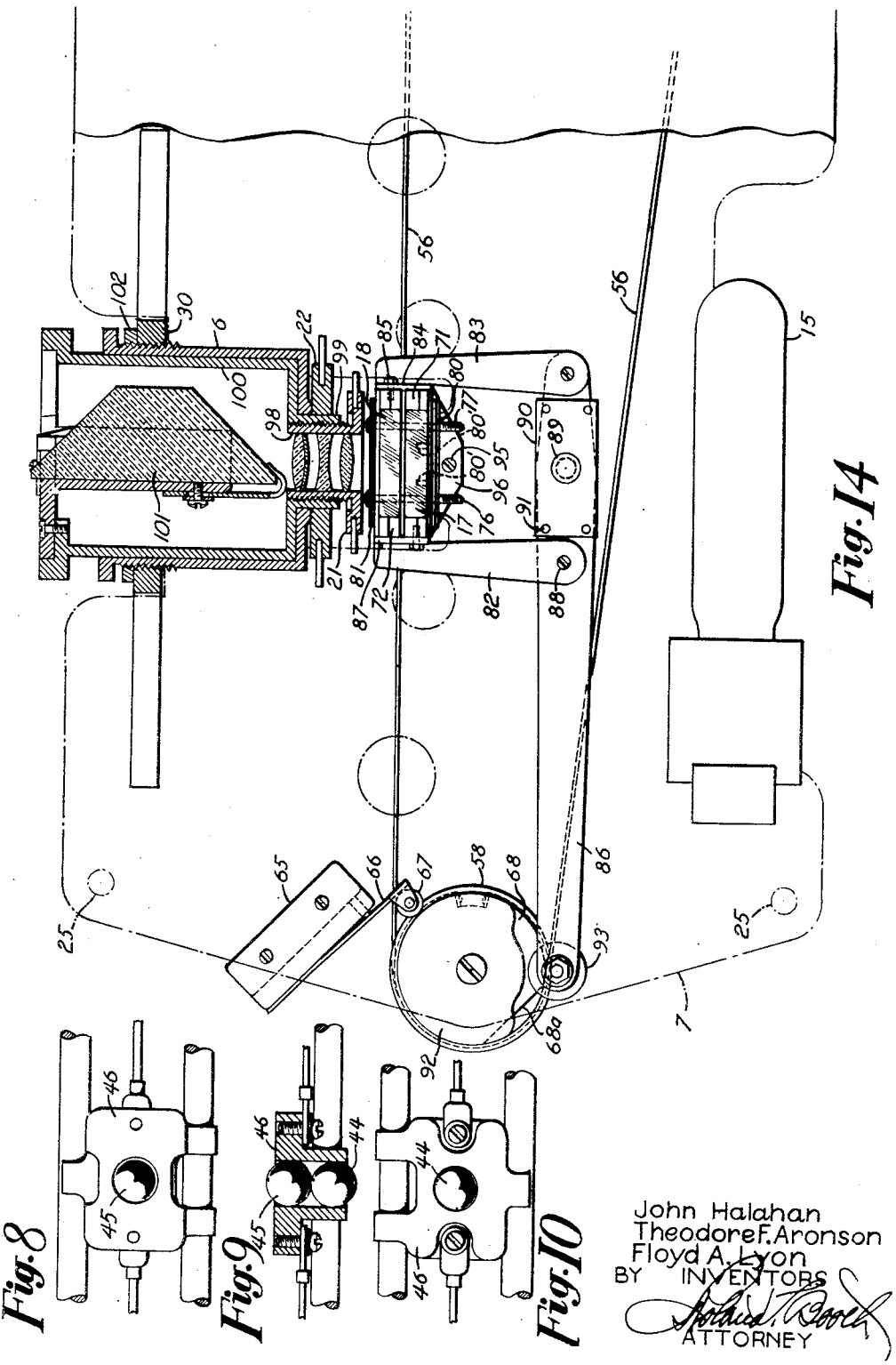
John Halahan
Theodore F. Aronson
Floyd A. Lyon
INVENTORS
BY
ATTORNEY Oct. 26, 1954  J. HALAHAN ET AL  2,692,529
FILM PROJECTION APPARATUS
Filed June 3, 1949  6 Sheets-Sheet 6

John Halahan
Theodore F. Aronson
Floyd A. Lyon
INVENTORS
BY
ATTORNEY

Patented Oct. 26, 1954

2,692,529

UNITED STATES PATENT OFFICE 2,692,529

FILM PROJECTION APPARATUS

John Halahan, Theodore F. Aronson, and Floyd A. Lyon, Elmhurst, N. Y., assignors to Remington Rand Inc., New York, N. Y., a corporation of Delaware Application June 3, 1949, Serial No. 96,892

16 Claims. (Cl. 88—24)

This invention relates to improvements in film projection apparatus of the type primarily intended for the projection of micro-film images for reading. In general, such apparatus includes feed and take-up spools which mount the film and are selectively drivable by means, such for example, as an electric motor for feeding the film through a gate by means of which it is located steadily enough for accurate focussing through an associated optical system onto a viewing screen.

The invention provides a film projector including motor means with control means for varying the rate of film feed, gate means in the form of transparent plates between which the film is engageable to be steadily located for focussing, and gate operating means operable automatically for separating the plates to open said gate means for free movement of said film when a predetermined rate of film feed is exceeded, said gate operating means being operable to ensure engagement of the film between the plates for focussing when the rate of film travel is reduced below the predetermined rate. Such an arrangement ensures that two speed ranges are provided, namely, a low speed range of operation having a predetermined upper limit at which separation of the plates is increased, and a high speed range in which the film is fed freely through the gate. The low speed range of operation can be conveniently designated the scanning range because, until separation of the plates occurs, the film is securely located in focus, and an operator can work in the scanning range as quickly as he or she is able according to individual skill and the complexity of the successively projected images. The high speed limit of the scanning range is selected as a point beyond which the rapidity with which sucsive images are projected makes any useful examination of them for identity checking purposes at least difficult, and it is found in practice that undue scratching of the film by the gate is unlikely to occur within the useful scanning range. Within the high speed range of operation the preferred arrangement according to the invention ensures that, though the operator may still be able to vary the speed of film feed, the plates do not close up to engage the film until the film is slowed down to a feed rate in the scanning range.

The invention provides micro-film projector apparatus comprising film spool mounting spindles, motor means connectable selectively with either of said film mounting spindles for film feed and rewinding as required, means for varying the rate of film feed in either direction of film travel, gate means engageable with said film between said film mounting spindles, optical projection means including focussing means and a source of illumination for illuminating said film and projecting an illuminated image through said gate means, and chassis means mounting the whole of said apparatus as a unit.

The invention provides a micro-film reader in which the speed and direction of film feed can be readily controlled by an operator preferably by means of a single and readily accessible control member so placed as to be readily accessible while the operator is viewing successively projected images.

The invention provides micro-film reader apparatus as a very convenient installation in which the mechanism is mainly enclosed in a cabinet structure in pedestal form embodying a desk part at which an operator may work with the control means readily accessible while viewing projected images. To that end the cabinet structure embodies a viewing screen constituting the front of a light-tight housing in front of which the film feed speed and direction control focussing adjustment means and film feed and take-up spools are disposed with an unobstructed writing space at one side thereof.

The invention provides micro-film reader apparatus in which the optical system includes adjustable prism means operable for image inversion so that any projected image can be viewed upright on the screen irrespective of the fact that all images are not necessarily upright on the film.

The invention provides a micro-film reader desk construction having a top portion formed with a recess to receive the film spools and film mounting, film feeding and projecting apparatus carried by a chassis, having a supporting plate cooperating with the desk to close and form the bottom wall of the recess in a manner which provides removal of the chassis from the desk with the assembled apparatus as a unit.

In the drawings:

Fig. 1 is a perspective illustrating a preferred form of projector according to the present invention.

Fig. 2 is a vertical cross-section through the projector portion with parts omitted and illustrating in dot and dash lines the location of the optical system and the outline of the chassis which mounts the drive mechanism.

Fig. 3 is a bottom plan view looking at the under-side of the driving mechanism.

Fig. 4 is a cross-section taken on line 4—4 of Fig. 3.

Fig. 5 is a cross-section taken on line 5—5 of Fig. 3.

Fig. 6 is a cross-section on the line 6—6 of Fig. 5.

Fig. 7 is a cross-section on the line 7—7 of Fig. 6.

Figs. 8, 9 and 10 are respectively a plan view, a cross-section and a view looking at the underside of a ball clutch element which is operable for starting, speed variation and stopping of the film drive.

Figure 11:
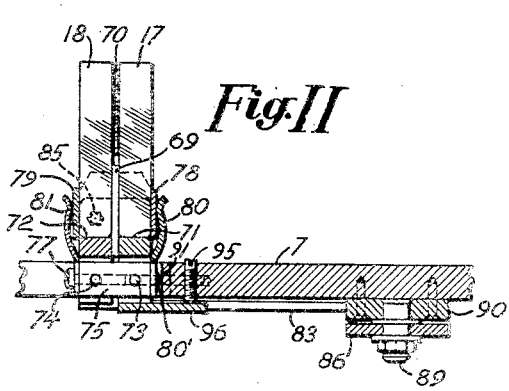
Fig. 11 is an enlarged fragmentary cross-section taken transversely through the film gate with the gate in the closed position.
Figure 12:
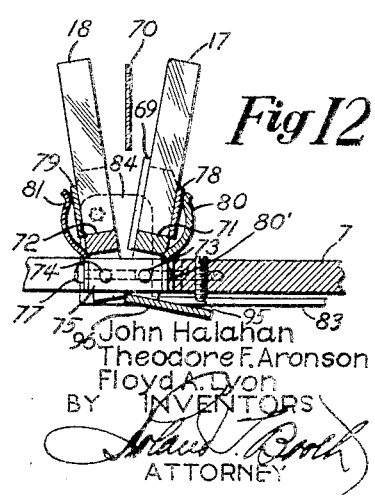

Fig. 12 corresponds to Fig. 11 but shows the gate in the open position.

Figure 13:
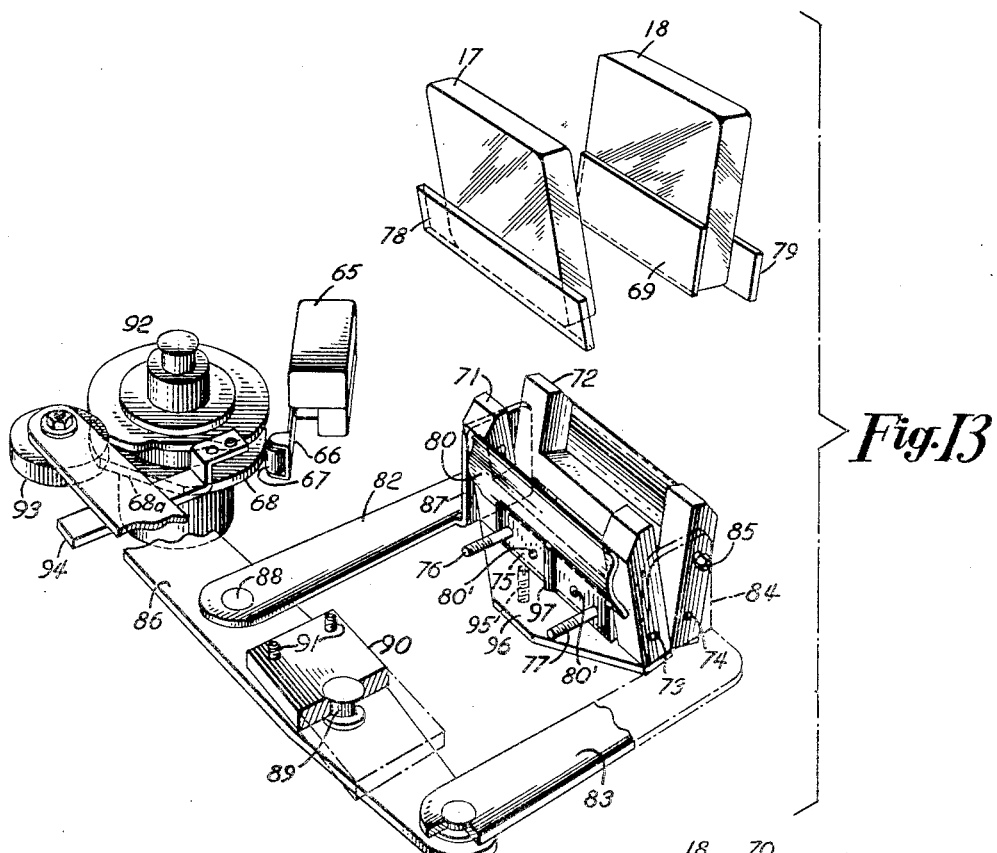

Fig. 13 is a fragmentary perspective developed to illustrate the gate actuating mechanism, the gate in this view being shown in the open position with the transparent plates positioned in spaced relationship above their mountings to illustrate their removability and to clarify the general showing of the parts.

Fig. 14 is a detailed horizontal fragmentary sectional view showing the relation between the film gate and the focussing tube and the relation between the mechanism for operating the film gate and the motor speed control means.

The device illustrated in Fig. 1 of the drawings indicates a typical micro-film reader layout according to the invention arranged as a desk or table having a top 1 supported on side members 2 and 3. The mechanism, that is to say, the driving means (not seen in Fig. 1 because it is enclosed by the casing), the film spools 4 and 5 and the lens mounting 6, are all mounted on a chassis installed as a unit. The main supporting plate of the chassis is uppermost indicated, for example, in Fig. 2 by the reference numeral 7, is secured to the under-side of the top 1. In the assembled condition the spools 4 and 5 and the lens adjustment means must be accessible, and the desk top 1 is therefore provided with a recess 8 beyond the upper limits of which neither the spools nor the lens focussing adjustment projects to any substantial extent. Mounted at a convenient angle for reading by an operator seated at the desk is a translucent screen 9 which encloses the sloping front portion of the substantially light-tight housing 10 which encloses a mirror for reflecting an image projected by the lens mounting onto the screen 9. An unobstructed writing surface 11 is provided at one side of the screen, upon which a stenographer, or an operator, can take notes, or copy the subject matter of the projected image. Also at a convenient point, preferably at the right-hand side of the screen, is a control knob 12 which, as later will be understood, is the sole means for controlling the speed and direction of film feed. Light is projected through the lens mounting from a lamp enclosed at the front end of the panel and is accessible through the door 13. A drawer 14 may be provided below the writing surface 11.

Fig. 2 illustrates the layout of the optical system, the lamp 15, condenser lens assembly 16, plates 17 and 18, comprising the film gate, the lens mounting 6, and the general outline of the driving mechanism as indicated in chain line. Film engages between the plates 17 and 18, and is illuminated by the lamp 15, and light reflected from the mirror 19 on the back of the door 13.

The image is focussed through the lens mounting onto the mirror 20, from which it is reflected onto the screen 9. The focussing adjustment is done by turning the spoked adjustment wheel 21 (shown in chain line), and a similar spoked adjustment wheel 22 (also shown in chain line) can be used to manipulate a prism for turning the projected image through any angle, e. g., a right angle, which is a convenient expedient to facilitate inspection of a projected image from a negative in an upright manner on the screen 9 irrespective of whether it extends longitudinally or transversely of the film. Details of the focussing and prism adjustment are illustrated in Fig. 14, and will be described in greater detail with reference thereto. The under-side of the mechanism and the housing 10 are enclosed by a panel which includes a hinged portion 23, which can be swung downwardly about a hinge at one side of the desk to give access to the mechanism, any convenient latch device being provided for holding the closure 23 up in the closed position. Preferably the housing 10 has the rim 24 detachably secured to permit removal of the screen 9 in order to render the mirror 20 accessible for cleaning.

The variable speed film drive is illustrated with reference to Figs. 3 to 10 inclusive. The drive requirement is an arrangement providing for starting and stopping, forward and reverse driving, and stepless speed variation over a given speed range from idling up to a predetermined maximum irrespective of the direction of drive. The arrangement according to the invention also enables the whole driving mechanism to be suspended from a mounting plate, which also serves to carry the optical system for installation and removal as a unit. The mounting plate 7 is provided at each of its four corners with bolt holes to be engaged upon the fixing bolts 25 (see Figs. 3 and 7) anchored in the under-side of the top 1, and is held in position by the wing nuts 26 against the lower ends of the tubular distance pieces 27 (see Fig. 7). Fixed to the under-side of plate 7 are side plates 28 and 29 to the front end of which the lens mounting plate 30 is secured by fixing screws (see Figs. 5 and 6). Also at their front ends the side plates 28 and 29 mount pivot pins 31 and 32 upon which the front end of a pivoted bottom plate 33 is supported. At the free end as will be seen with reference to Figs. 6 and 7, the bottom plate 33 carries the upwardly projecting spacer bar 34 conveniently constituted by a bolt alongside which is provided the tension spring 35, connected at the top to the mounting plate 7 and at the bottom to plate 33. In the neutral position as seen in the drawings the spring 35 draws the free end of the bottom plate upwardly to a predetermined limit defined by the point at which the head of the spacer bar 34 makes contact with the under-side of the mounting plate 7 but, under driving conditions, as will later be understood, the free end of the bottom plate can yield downwardly against the tension exerted by the spring 35.

For the driving means it is preferred to employ an electric motor 36 secured to the under-side of the mounting plate 7 by the fixing strap 37. Through bevel gearing enclosed by the housing 38 (see Figs. 5 and 6) the motor drives the belt pulley 39, and the belt 40 transmits the drive to the pulley 41 on the spindle 42, mounted in ball bearings in the bottom plate 33. Above the bottom plate 33 the spindle 42 mounts a drive disc 43 upon which rests the ball 44. An upper ball 45 cooperates with the ball 44, both balls being mounted by the cage 46, the position of which along a diameter extending transversely across the drive disc 43 can be varied as will later be understood. The outer ball engages with either of the two truncated conical rollers 47 and 48 according to the position of the ball cage 46. The rollers 47 and 48 are each mounted on ball bearings for free rotation on the spindle 49 carried by the frame members 28 and 29, but to prevent excessive over-running or coasting and to render the rollers 47 and 48 more controllably responsive to speed changes, spring members 47a and 48a mounted upon the under-side of the mounting plate 7 bear upon the respective rollers 47 and 48. The roller 47 has at its outer end the bevel pinion 50 which rotates as one with the roller to drive the crown wheel 51 by which the film spool spindle 52 is driven. A similar arrangement is provided at the outer end of the roller 48 where the bevel pinion 53 drives the film spool spindle 54 through the crown wheel 55. It will be noted that the rollers 47 and 48 are axially spaced and that in the neutral position in which the ball cage 46 is shown in Figs. 4 and 5, the upper ball does not contact either roller, while furthermore, in that position of the ball cage, the lower ball 44 is substantially on the center of the disc 43: consequently, therefore, the ball 44 then merely rotates about an upright axis coincident with that of the spindle 42 and no drive is transmitted. Flexible control cables 56 engage pulleys 57 and 58 of which the former is associated through its spindle 59 with the external control knob 12. Intermediate its ends one of the control cables 56 is connected to the ball cage 46, the position of which is thus controllable so that it can be moved to any point eccentric in relation to the disc 43 while maintaining driving contact with one or other of the rollers 47 and 48 according to the direction of its movement. It should be noted that the control cables 56 do not constitute an endless belt but are separate lengths each having its ends wrapped around and anchored to the respective pulleys 57 and 58 (see Fig. 14 in respect of pulley 58), so as to ensure positive movement of the ball cage and the pulley 58 to the required extent in response to movement of the control knob 12. The positive control ensures that movement of the pulleys 57 and 58 and the ball cage 46 are kept in step, and the limits of movement are defined by some convenient form of stop means, such for example, as the pins 60, 61, cooperating between the under-side of the control knob 12 and a convenient fixed stop means.

As viewed, for example in Fig. 4, the control knob is manipulated to move the ball cage 46 rightwardly, then the upper ball 45 makes contact with the roller 47 while the lower ball 44, being eccentric relative to the disc 43, and having rolling contact with upper surface of the disc, is turned about a horizontal axis coincident with a radius of the disc in alignment with the longitudinal axis of the roller 47. Rotation of the lower ball 44 thus frictionally drives the upper ball 45 correspondingly, and that in turn drives roller 47 to rotate the film spool spindle 52 through the gearing 50, 51. The greater the eccentricity of the ball cage the higher will be the speed at which the roller 47, and consequently the spindle 52, is driven.

If the ball cage 46 is moved leftwardly as viewed in Fig. 4, rotation of the film spool spindle 54 results through its associated roller 48 and gearings 53, 55, but spindle 54 then rotates in a direction opposite to that in which the spindle 52 was previously driven. The arrangement therefore ensures that film spools mounted on the respective spindles 52 and 54 can be selectively operated for feeding the film in either direction at any speed desired from zero up to a predetermined maximum, as determined by the limit of eccentricity relative to the disc 43 to which the ball cage 46 can be moved, and in order to make the neutral position less critical the adjacent inner ends of the rollers 47 and 48 are preferably chamfered as clearly seen in Figs. 4 and 5.

The taper of the rollers 47 and 48, increasing in diameter outwardly from the center of the disc 43, coupled with the pivotal and spring loaded mounting of the base plate 33, is of considerable importance. Thus, since the gripping action on the balls 44 and 45 between the drive disc 43 and the roller 47 or roller 48, at any point other than the neutral position, is dependent on the tension of the spring 35, slippage in drive transmission through the coupling is not likely to occur, as might otherwise be the case, if there is slight lack of parallelism between the surface of the drive disc 43 and the roller spindle 49. Furthermore, since, due to the taper of the rollers 47 and 48, the tension in the spring 35 is increased as the eccentricity of the ball cage 46 becomes greater, the normally increasing tendency to slippage between the driving and driven elements at higher ratios is also reduced.

The motor 36 is also utilized to drive the blower 62 through the shaft 63 (see Fig. 3), the output nozzle 64 of the blower (see Figs. 6 and 7) being so directed as to blow cooling air onto the lamp 15.

The motor 36, in the arrangement now being described is intended for operation at two speeds. It is preferred to vary the speed of the motor by cutting in or out, as the case may be, a resistance or equivalent member taking some part of the current supplied to the motor, by operation of the micro-switch 65. The micro-switch 65 is actuated by the spring lever 66, carried by the casing and having at its outer end the roller 67 engaging the switch actuating cam 68, which is mounted for movement with the pulley 58 when the pulley 58 is turned by operation of control knob 12.

Figs. 11, 12, 13 and 14 illustrate the film gate and its method of operation for opening and closure. In Fig. 11 the two transparent plates 17 and 18 which define the gate are shown in the closed position spaced at the lower end by the distance piece 69, above which a space is defined within which the film indicated by the reference numeral 70 can be located sufficiently steadily for accurate focussing without being so tightly engaged by the plates that there is substantial resistance to its travel through the gate. Fig. 12, on the other hand, shows the plates in a separated condition, corresponding to the open setting of the gate, established when the film is traveling in the high speed range of operation at which accurate focussing is anyway pointless, and separation of the plates is desirable to prevent scratching, or over-heating of the film 70.

Each of the glass plates 17, 18, which cooperate to define the gate, is engaged in an H-shaped frame member. The glass mounting frames are indicated by the reference numerals 71 and 72 respectively, and each is attached by its respective pivots 73, 74 to a mounting block 75 secured in a cutaway portion of the mounting plate 7 by fixing screws 76 and 77. Each of the glass plates 17, 18 is accurately fitted into the upwardly projecting arms of its respective mounting frame 71 or 72, and the bottom edge of each plate rests upon the cross-bar of its respective frame. A supporting bar 78 is provided across the bottom at the outside of the plate 17 having opposite ends extending beyond the edges of the plate. A similar supporting bar 79 is provided at the outside of the plate 18, and the supporting bars 78 and 79 are each held against the respective glass mounting frames by the respective springs 80 and 81 mounted on the ends of the block 75. The flat base portion of the spring 80 is secured to the inner end of the mounting block 75 by screws such as 80', and, with the block in position, the screws 76 and 77 secure the flat base portion of the spring 81 against the outer end of the block 75. Such an arrangement provides for easy removal of the plates 17 and 18 merely by pulling them upwardly out of their supporting frames when required for cleaning, and it ensures their steady location in the pivoted frames when in use.

Pivotal movement of the glass mounting frames 71 and 72 is controlled by the respective actuating links 82, 83. The link 83 has an upstanding lug 84 (seen in dot and dash lines), connected by pivot pin 85 mounted on the frame 72 at a point above the pivot 74, and, at its other end, the link 83 is pivotally connected to the gate actuating lever 86. The link 82 is similarly connected to the glass mounting frame 71 through the end lug 87, and the link 82 has its other end pivotally connected at 88 to the gate actuating lever 86. The gate actuating lever is mounted to rock about its pivot 89 which is midway between the pivots of the links 82 and 83 on the gate actuating lever, and it therefore follows that rocking of the gate actuating lever in one sense moves the links 82 and 83 oppositely to swing the frames 71 and 72 about their respective pivots 73 and 74 to allow the springs 80 and 81 to bring the plates 17 and 18 together, whereas the plates are separated when the gate actuating lever is rocked in the other sense about its pivot. The pivot 89 is carried by the bearing block 90 attached to the under-side of the mounting plate 7 by the screws 91.

The lever 86 is actuated for controlling the gate by the gate actuating cam 92, which is arranged coaxially with respect to the pulley 58 and the switch actuating cam 68, and is therefore under direct control of the manual control knob 12. A roller 93 mounted on the end of the gate actuating lever 86 rides on the periphery of the gate actuating cam. The springs 80 and 81, which react resiliently against their respective glass mounting frames, and thereby through the links 82 and 83, apply a turning moment to the gate actuating lever 86 about its pivot 89 in the sense required to maintain the roller 93 in contact with the cam 92. It will be noted that the greater portion of the operating surface of the contact actuating cam 92 is constantly arcuate about the center, and when the roller 93 is running on the arcuate portion of the cam 92 the cam actuating lever 86 is in the position shown in Fig. 13 and the gate is open. Conversely, when the roller 93 drops into the recessed contoured portion of the cam 92, the gate is moved into the closed position, as seen in Fig. 14.

The bracket 94 slidably supports the cam engaging end of the gate actuating lever 86 so that accurate engagement of the roller 93 with the gate actuating cam 92 is ensured. Conveniently the bracket 94 is attached to the under-side of the mounting plate 7.

Also shown in Figs. 11, 12 and 13, is a gate adjustment screw 95, best seen in dotted lines in Fig. 13. The function of the adjustment screw 95 is to achieve perpendicularity of the plates 17 and 18 with respect to the optical axis. Thus, the spring 80 is stronger than the spring 81 and, until the plates are separated by actuation of their operating linkage, the spring 80 acts upon the frame 71 to bring the plate 96, which is attached to the bottom of the frame 71, into engagement with the nose of the adjustment screw 95, and it follows that the true vertical position of the plates can be set in initially, or at any time subsequently when adjustment is required, by operation of the screw 95. It is also important that true perpendicularity with respect to the optical axis should be achieved in the horizontal sense. For that purpose a projection 97 is provided centrally of the flat base portion of the spring 80, upon which projection 97 the block may be rocked about a vertical axis by adjustment of the screws 76 and 77.

The relation between the switch actuating cam 68 and the gate actuating cam 92 is best understood by comparison of Figs. 13 and 14. In Fig. 13 the gate is open, separation of the plate being ensured by reason of the fact that roller 93 is engaged with the circumferential portion of the gate actuating cam 92. On the other hand, in the setting as seen in Fig. 14 corresponding to the neutral position of the ball cage 46, the plates are in their closed relationship and will remain so to locate the film adequately steadily for focussing within the scanning range of operation. Thus, with the cam form shown in Fig. 14 intended to provide for approximately 180° cam rotation on either side of that neutral setting, rotation of the cam responsive to movement of the control knob and corresponding eccentricity variation of the ball cage 46 coincides with a gradual progressive increase in the rate of film travel up to the limit of the scanning range of operation and then, as the roller 93 rides up onto the arcuate lift portion of the cam 92, the gate actuating lever 96 is actuated to open the gate. The eccentricity of the ball cage relative to the drive disc 43 can be further increased to increase the rate of film feed correspondingly and progressively until such time as the flat portion 68a of the switch actuating cam 68 registers with the roller 67 of the switch actuating lever 66, whereupon the driving motor is switched into its high speed range of operation. Thus, with the cam arrangement shown, the driving motor operates in its high speed range of operation only near the limits of rotation of the gate actuating cam 92 and while the gate is still open. It will also be appreciated that since the cables 56 are flexible it is necessary in order to control the cams for the full 180° rotation on either side of the neutral position, that the ends of the cables 56 must wrap the pulley 58 through at least 180° and preferably to a considerably greater extent, as clearly seen in Fig. 14 and the ends of the cable are therefore overlapped on the pulley 58 extending round in opposite directions toward their respective points of anchorage.

In illustrating the relationship between the film gate and the focussing adjustment mechanism, Fig. 14 also shows the adjustment details of the adjustable part of the optical system. In that respect the reference numeral 98 indicates the lens barrel which has a screw threaded engagement with the neck portion 99 of the prism housing 100 for fine focussing adjustment. The prism housing 100 is embraced by the external carrier member which constitutes the lens mounting, here represented again by the reference numeral 6 to correspond to the showing in Figs. 1, 2 and 6. The lens mounting 6 is engaged in the threaded opening of the lens mounting plate 30. Focussing adjustment is performed by operation of the spoked adjustment wheel 21 which turns the lens barrel 98 in the reduced neck portion 99 of the prism housing 100. On the other hand, the prism housing can be rotated by the spoked adjustment wheel 22 in order to turn the prism 101 into any desired relationship relative to the optical axis in order that any projected image can be made to appear upright on the viewing screen irrespective of its disposition on the film. Frictional engagement of the prism housing in the member 6 is such relative to the friction at the screw thread between the lens barrel 98 and the neck portion 99 that the prism housing does not turn with operation of the focus adjustment wheel 21. On the other hand, actuation of the prism adjustment wheel 22 does not alter the focus because the member 6 is locked by the ring 102 and the prism housing rotates as a whole within the member 6 against relatively high friction without altering the position of the lens or the prism along the optical axis. Focus adjustment by the wheel 21 is intended for very fine focussing and major adjustment at installation can be achieved by turning the member 6 relative to the mounting plate 30.

In operation of the device the film to be inspected is placed by the operator on the film spindle 54. The film spool is seen in the position of the left-hand spool shown in Fig. 1. The free of the film is then passed through the gate and around the film guide rollers usually provided one on each side of the gate and then attached to the take-off spool which is in the position occupied by the spool 5 in Fig. 1. The apparatus is usually left connected to a conveniently available source of electric power: therefore, to start film feeding, the operator turns the control knob 12 in anti-clockwise direction. If the operator desires to inspect the images individually, as they appear successively projected onto the screen 9, he will turn the control knob only to a small extent, the effect of which will be to move the ball cage 46 to a position only slightly eccentric in relation to the driving disc 43, thus driving the roller 47 at only a comparatively slow speed. In most cases, some sort of indexing system is usually provided in conjunction with the film, and an operator may consequently know that the particular image which he desires to inspect will be, for example, half-way along the length of a hundred feet or so of film. In that case instead of feeding the film at comparatively slow rate the operator can turn the knob to feed the film at high speed. If the control knob 12 is turned sufficiently far, it will first move the ball cage to a point considerably eccentric in relation to the center of the driving disc 43 thus increasing the gear ratio through the variable speed coupling until such time as the film gate is automatically opened and the film feed rate can, if desired, be rapidly increased as the motor is switched into its high speed range of operation near the limit of control.

As has been explained in the foregoing description, the gates remain closed in order to achieve location of the film adequately steady for reasonably accurate focussing in the scanning range of operation, and it is important that a gradual speed increase is provided through the variable speed coupling, always under control of the control knob 12, so that the operator can readily adjust the speed at any time within the scanning range. When the operator knows that he is getting to a point in the film from which the desired image is going to be projected onto the screen, he slows down the film feed rate by manipulation of the control knob 12 until he sees the required image projected and then he turns it quickly to the stop position. Turning the control knob 12 to the stop position returns the ball cage 46 to the neutral position in which it is shown in Figs. 4 and 5, whereat no drive is transmitted. Preferably the motor remains operative until such time as the machine is completely stopped by a convenient main switch, for so long as the lamp 15 remains lighted, the motor has the subsidiary function of driving the cooling fan 62. In some cases, however, a separate motor may be provided for driving the blower. Likewise a suction fan may be substituted for the blower for circulation of cooling air about the mechanism.

In general it is unnecessary to interfere with the focussing adjustment to any appreciable extent because, once the optical part of the system is set, it is unlikely that it will be necessary to alter it, but if adjustment is required in any individual case, it can readily be performed by manipulation of the focussing adjustment wheel 21. Similarly, if it so happens that the image which the operator requires to inspect appears projected on the screen sideways or upside down, or inclined to such an extent as to make it difficult to read, the operator can project it the right way up for reading by manipulation of the prism 101 by means of the adjustment wheel 22.

Having inspected the desired projected image or images, the film can be rewound on the spool by turning the control knob in the reverse direction until a desired speed for rewinding is reached and when all the film is rewound on the feed spool it is a simple matter to remove the rewound spool leaving the machine available for subsequent operation.

It has been stated that the film feed and drive mechanism, the motor, the film gate and its associated actuating mechanism, the lighting means and the optical system are all mounted as a unitary chassis, the principal element of which is the plate 7. Such an arrangement has many advantages for, not only does it facilitate servicing operations to the extent that in the desk form illustrated the servicing mechanic merely has to open or remove the closure 23 (see Fig. 2) to gain access to the wing nuts 26, and on their removal all the mechanism can be dropped out as a unit, but also the feature is important to the extent that a standard chassis unit can be installed in widely differing forms of casing.

The death of the recess 8 in the top 1 (see Fig. 1) of the desk is preferably such that it accommodates the film spools, the gate and the upper parts of the optical system entirely within the depth of the recess, and a hinged or removable closure may be provided to extend over the top of the recess.

It will be appreciated that modifications may be made without departing from the scope of the invention, for example, since the relationship of gate opening to both the rate of film feed and to operation of the driving motor in the high speed range is dependent upon the setting and relationship of the cams, the relationship may be varied within wide limits by altering the profile of the cams or by altering their setting. In some cases provision may be made for readily adjusting the cam setting to meet different operating conditions. Also, although as hereinbefore described, both gates are movable under the influence of the operating linkage, it may suffice to have one gate fixed in a plane normal to the optical axis and to move only the other one relative to it for opening and closure of the gate. Likewise, instead of using a resistance or some equivalent member to be cut in or out to vary the speed of operation of the driving motor, the motor may have alternative field windings adapted to be selectively switched in or out to vary the motor speed. There are, in fact, many well known expedients which may be adopted for varying the speed of the out put drive member of the motor, any of which might be adapted for the purposes of the present invention. The arrangement may be such that the high speed range of motor operation is used only for rewinding the film, in which event the switch 65 may, in some applications be replaced by a reversing switch, which may be manually or automatically controlled to drive the motor in reverse at high speed.

The variable speed reversible drive friction coupling hereinbefore described has wider application in the general field of variable drive ratio couplings per se is the subject of application S. N. 96,891 filed concurrently herewith, now patent No. 2,585,460 patented February 12, 1952, and of applicancy and assignment common with the instant application.

The invention claimed is:

1. Projector apparatus of the class described including gate means constituted by transparent plates having a closed relationship in which they locate film between them for focussing and a spaced open relationship in which they are separated equidistantly from and out of engagement with said film, gate actuating means having a pair of links, each connected to one of said plates, each link being movable for moving said plates from the closed to the spaced open relationship and vice versa, motor means drivably coupled with film feed means, a manually operative control mechanism operatively associated with said motor means for varying the speed thereof, and a positively operable gate control mechanism having lever means engaged with said links actuable by said manually operative control mechanism to operate said links and gate to concurrently move said plates to the spaced open relationship when a predetermined speed of film feed is exceeded and to the closed relationship when the film feed falls below said predetermined speed.

2. Projector apparatus of the class described including gate means constituted by transparent plates having a closed relationship in which they locate film between them for focussing and a spaced open relationship in which they are separated equidistantly from and out of engagement with the film, gate actuating means for concurrently moving said plates from the closed to the spaced open relationship and vice versa having a pair of actuating links, each connected to one of said plates at one end and a lever connecting said links at the opposite ends, motor means drivably coupled with film feed means through a mechanical variable speed coupling, manual control means operatively associated with said coupling for varying the rate of film feed and also said gate actuating means, and a gate control mechanism actuable by said manual control means to operate said gate to concurrently move each of said plates to the spaced open relationship when a predetermined speed of film feed is exceeded and to the closed relationship when the film feed falls below said predetermined speed.

3. Projector apparatus of the class described including gate means constituted by transparent pivotal plates having a closed relationship in which they locate film between them for focussing and a spaced open relationship in which they are separated out of engagement with film, a gate actuating mechanism for moving each of said plates from the closed to the spaced open relationship and vice versa, motor means having at least two constant speeds of operation, namely, high speed and a low speed, a variable speed coupling mechanism operative between said motor and film feed means for driving said film feed means from said motor means, switch means operative to determine whether said motor means shall operate in the high speed or the low speed range of operation, manual control means operatively associated with said switch means, said variable speed coupling mechanism for varying the ratio thereof and with said gate actuating mechanism through a gate control mechanism actuated by said manual control means to operate the gate for moving each of said plates to the spaced open relationship when a predetermined rate of film feed is exceeded and to the closed relationship when the film feed falls below said predetermined rate.

4. Apparatus as set forth in claim 3 wherein the manual control means operates cam means operative for actuating both the switch means and the gate actuating mechanism.

5. Micro-film projector apparatus comprising film spool mounting spindles, optical projection means including focussing means and a source of illumination for illuminating and projecting photographic images from film mounted on said film spool mounting spindles, gate means constituted by transparent pivotal plates having a closed parallel relationship in which they locate film between them for focussing through the optical system and a spaced open angular relationship in which they are separated out of engagement with film, a gate actuating mechanism for pivotally moving each of said plates from the closed to the spaced open relationship and vice versa, constant speed motor means, a variable speed and reversible drive coupling mechanism drivably connectable selectively with either of said film spool mounting spindles, and manual control means operative for controlling the drive ratio and direction of drive through said coupling for selecting which of said film spools is driven for film feed or rewinding as required, said manual control means also being operatively associated with said gate actuating mechanism for moving said plates to the spaced open relationship before a predetermined rate of film feed is exceeded and to the closed relationship after the film feed falls below said predetermined speed.

6. Apparatus as set forth in claim 5 wherein the variable speed coupling mechanism provides an infinitely variable drive ratio over a predetermined range, said manual control means being operable to achieve a progressive variation in the rate of film feed.

7. Apparatus as set forth in claim 5 in which the entire mechanism is mounted upon a main supporting plate whereby it may be installed in and removed as a unit from an enclosing casing.

8. Micro-film projector apparatus comprising film spool mounting spindles, optical projection means including focussing means, prismatic image correcting means and a source of illumination for illuminating and projecting photographic images from film mounted on said film mounting spindles, gate means constituted by pivotal transparent plates having a closed parallel relationship in which they locate film between them for focussing through said optical system and a spaced open relationship in which they are angularly separated out of engagement with film, a gate actuating mechanism for moving each of said plates from the closed to the spaced open relationship and vice versa, constant speed motor means, a variable speed and reversible drive coupling mechanism drivably connected selectively with either of said film spool mounting spindles, manual control means operative for controlling the drive ratio and direction of drive through said coupling mechanism for selecting which of said film spools is driven for film feed or rewinding as required, said manual control means also being operatively connected with said gate actuating mechanism for moving said plates to the open relationship before a predetermined speed of film feed is exceeded and to the closed relationship after the film feed falls below said predetermined speed, and a casing enclosing the motor means, said variable speed coupling mechanism, said source of illumination and gate control means but leaving said film mounting spindles, said gate means, said focussing means, said prismatic image correcting means and said control means accessible externally of the casing.

9. A micro-film projection apparatus as set forth in claim 8 in which the manual control means and the spool mounting spindles are accessible at the top of the casing, and in which the casing incorporates a viewing screen on which projected images can be viewed, said screen comprising a casing part behind and above said control means and said spool mounting means and enclosing mirror means for reflecting projected images onto said screen, whereby an operator can control the mechanism for starting, speed variation and for stopping while viewing images projected onto the screen.

10. Micro-film projection apparatus comprising film spool mounting spindles, optical projection means including focussing means and a source of illumination for projecting a photographic image from film extending between said film spool mounting spindles, gate means constituted by transparent plates having a closed relationship in which they locate film between them for focussing through the optical system and a spaced open relationship in which they are separated out of engagement with the film, a gate actuating mechanism for concurrently moving each of said plates from the closed to the spaced open relationship and vice versa, a dual speed motor means having a low speed and a high speed, switch means operable to determine whether said motor operates in high speed or in low speed, a variable speed coupling mechanism operable between said motor and either of said film mounting spindles selectively, manual control means operable for controlling the drive ratio and direction of drive through said coupling mechanism for selecting which of said film spools is driven according to whether film feed or rewinding is required, said manual control means also being mechanically connected with said gate actuating mechanism and with said switch means to concurrently move each of said plates to the spaced open relationship before said switch means is actuated for operation of the motor means at high speed and to the closed position after the switch is operated to reduce the speed of the motor means into low speed.

11. In a film projector including constant speed motor means with mechanical control means for varying the rate of film feed, gate means in the form of pivotally mounted movable plates adapted and arranged to locate said film between them in parallel relation for focussing, gate control means operable automatically for concurrently pivoting each of said plates equidistantly and angularly away from said film when a predetermined rate of film feed is exceeded and for concurrently bringing each of said plates into a close film locating relationship again when the rate of film feed is reduced below said predetermined speed.

12. A film projector including means for focussing a projected image of said film, gate means comprising two normally parallel pivotally mounted plates between which said film is located for accurate focussing, film traversing means including motor means having two constant speeds, namely, a slow speed for scanning with the film engaged between said parallel plates whereby to be held in focus, and a high speed, and means for concurrently pivoting each of said plates equidistantly and angularly away from said film to open said gate for free film traversal at the high speed range of motor operation.

13. A film projector as set forth in claim 12 in which the constant speed uni-directional motor means drives the film traversing means through mechanical variable speed transmission mechanism manually controllable to vary the film speed.

14. A film projector as set forth in claim 13 in which the mechanical variable speed transmission mechanism also provides for reversibility, whereby drive may be transmitted for feeding the film in either direction so that film feed and rewinding may be effected without removal of the film from the projector.

15. A film projector including uni-directional motor means having two selective constant speeds coupled to film drive means through a mechanically variable speed drive coupling mechanism, gate means comprising two separable plates adapted and arranged to locate film being projected for accurate focussing therebetween, means to manually select either constant speed of operation of said motor means, means operative between said coupling mechanism and said gate means to separate said plates equidistantly from said film when the rate of film feed exceeds a predetermined speed and to concurrently close said plates again when the film falls below said predetermined speed, and a single control member manually operable for varying the drive ratio through said coupling mechanism and, at a predetermined setting, operating said motor speed selection means to increase the speed of said motor means to the higher constant speed.

16. A film projector as set forth in claim 15 in which the mechanical connection between said coupling mechanism and said gate means is such as to ensure that the plates of the gate are opened before said predetermined rate of film feed is exceeded and remain open until the film feed falls below said predetermined rate.

References Cited in the file of this patent

UNITED STATES PATENTS

| Number | Name | Date |
| --- | --- | --- |
| 2,121,061 | Townsend | June 21, 1938 |
| 2,177,638 | Draeger | Oct. 31, 1939 |
| 2,231,395 | Schlegel | Feb. 11, 1941 |
| 2,377,476 | Berglund | June 5, 1945 |
| 2,407,009 | Holbrook | Sept. 3, 1946 |
| 2,425,704 | Nemeth | Aug. 12, 1947 |
| 2,464,220 | Duncan | Mar. 15, 1949 |
| 2,486,157 | Halahan | Oct. 25, 1949 |
| 2,487,476 | Pratt | Nov. 8, 1949 |
| 2,610,540 | Beitz | Sept. 16, 1952 |